May 26, 1959
W. H. EDMUNDS
2,888,535
REMOVABLE AND REPLACEABLE CURRENT LIMITER
HOUSING FOR CIRCUIT BREAKERS
Filed Dec. 3, 1954
2 Sheets-Sheet 1
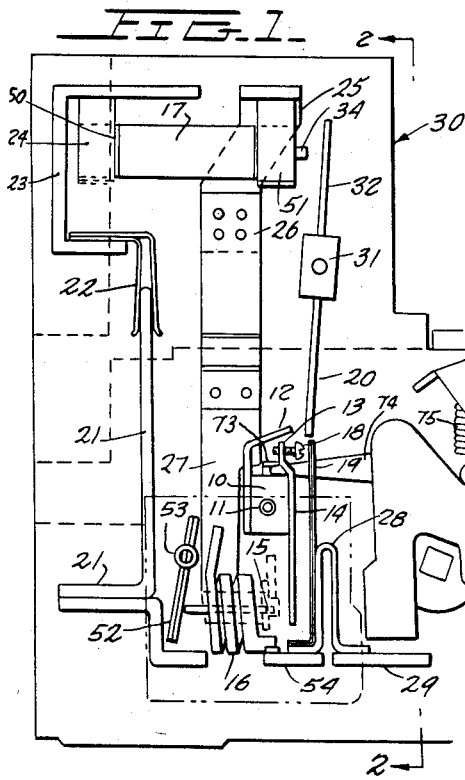
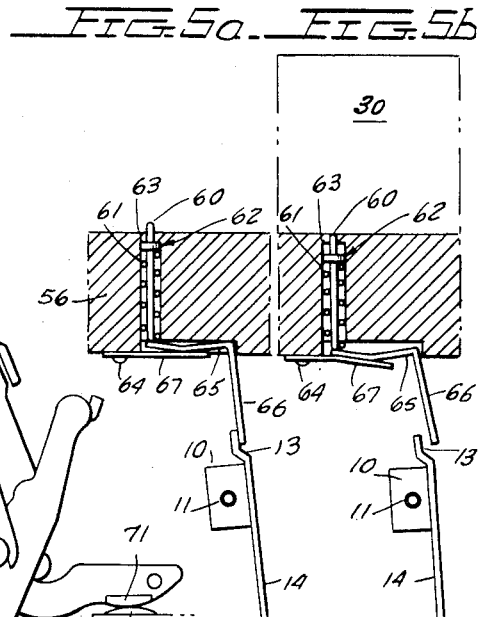
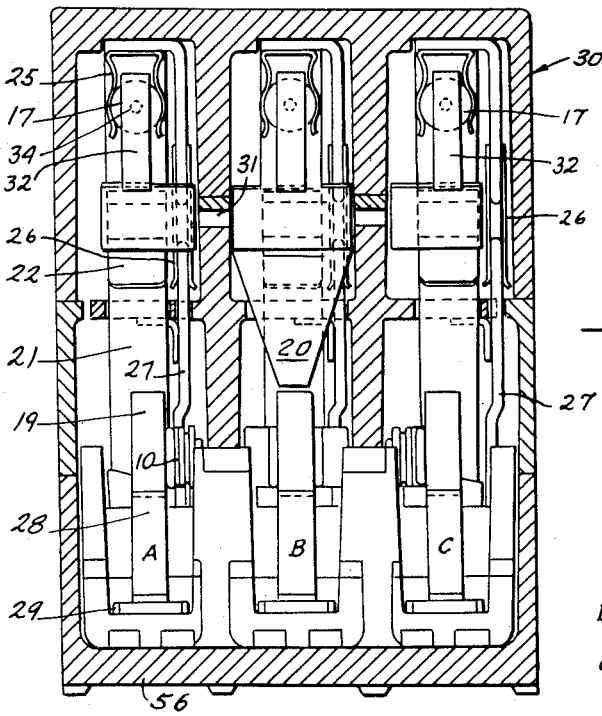
INVENTOR.
WILLIAM HAROLD EDMUNDS
BY
Ostrolenk & Faber
ATTORNEYS May 26, 1959　　　　　W. H. EDMUNDS　　　　2,888,535
REMOVABLE AND REPLACEABLE CURRENT LIMITER
HOUSING FOR CIRCUIT BREAKERS
Filed Dec. 3, 1954　　　　　　　　　　　　2 Sheets-Sheet 2
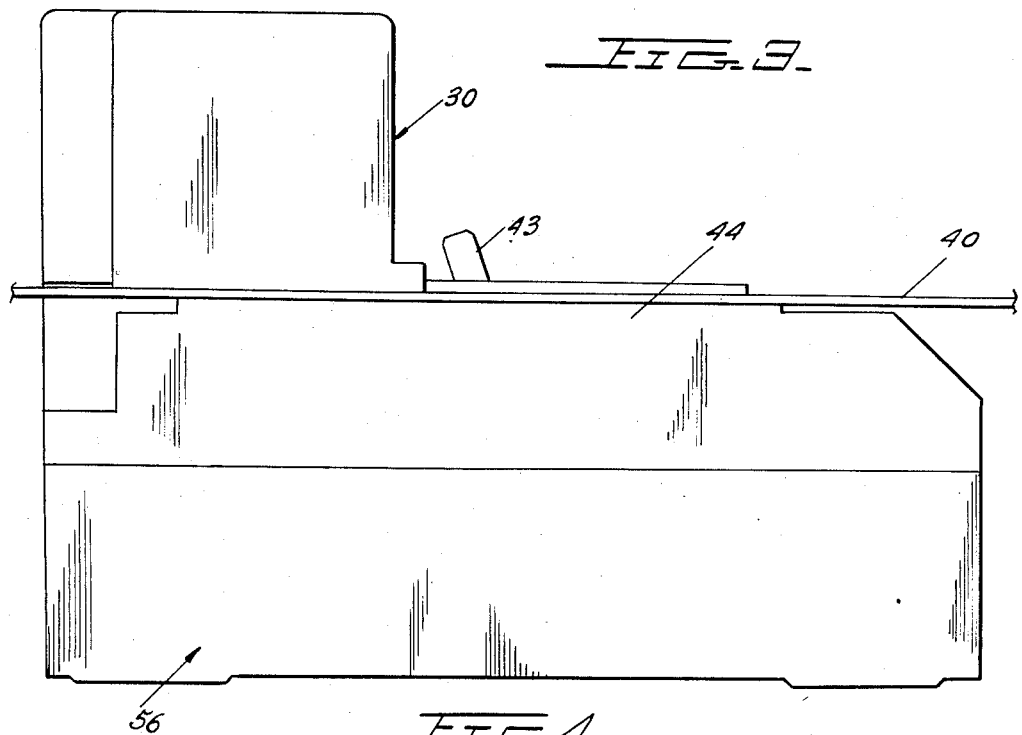
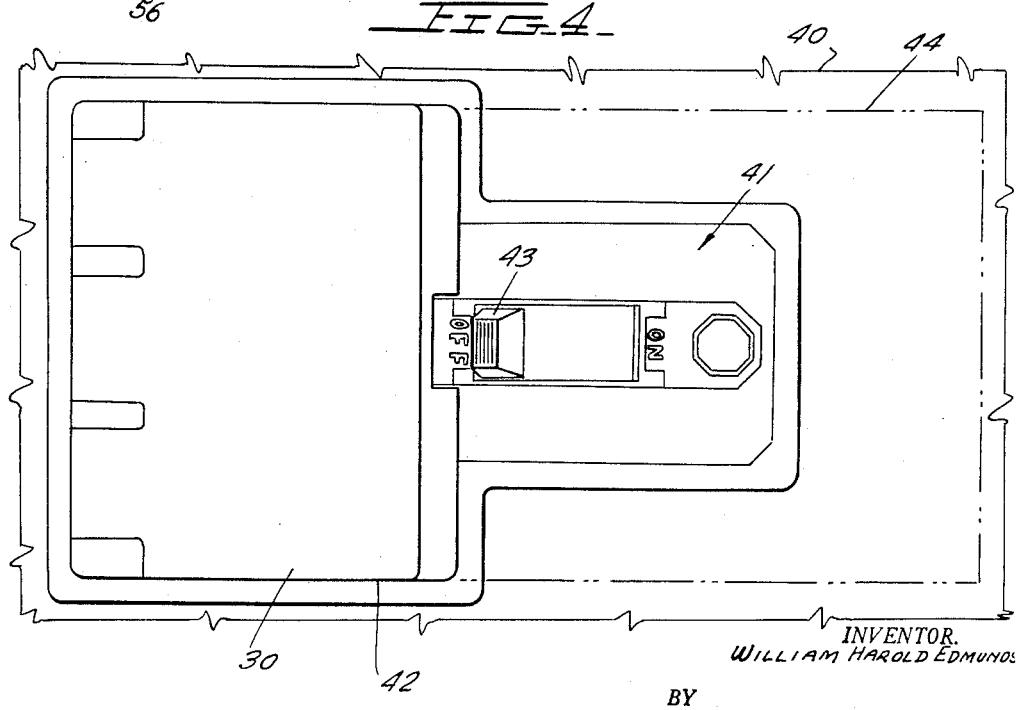
INVENTOR.
WILLIAM HAROLD EDMUNDS
BY
Ostrolenk & Faber
ATTORNEYS United States Patent Office 2,888,535
Patented May 26, 1959

2,888,535

REMOVABLE AND REPLACEABLE CURRENT LIMITER HOUSING FOR CIRCUIT BREAKERS

William Harold Edmunds, Havertown, Pa., assignor to I-T-E Circuit Breaker Company, Philadelphia, Pa., a corporation of Pennsylvania Application December 3, 1954, Serial No. 472,969

16 Claims. (Cl. 200—114)

My invention relates to a combination of a circuit breaker and a current limiting device having electrical and mechanical coordination and, more particularly, is directed to a novel arrangement whereby the current limiting means are electrically and mechanically removably connected and mounted on the circuit breaker.

The structure of my instant invention is an improvement over the combination shown in my copending patent application Serial No. 461,378, filed October 11, 1954, and is particularly adapted to low voltage high current circuits as described in the copending case.

In recent years, the capacity of electric circuits has constantly been increasing so that the magnitude of available short-circuit current which the circuit is capable of delivering in many instances exceeds either the interrupting capacity of the circuit protective equipment and/or the maximum thermal and magnetic stresses to which the circuit can be subjected. In view of these changes, recent development has been directed toward electrical and mechanical coordination between circuit breaker and current limiting device so that all of the advantages of each of the respective components can be utilized.

The current limiting devices used in my invention are well known in the art and may be constructed as noted in Patent 2,592,399, issued April 8, 1952. This type of current limiting device contains quartz crystal surrounding a fusible link and is constructed and designed so that fault current will be completely interrupted within the first quarter of a cycle. That is, the magnitude of let-through current will be considerably less than the magnitude of available short-circuit current, i.e., 10% in some cases, and will only be approximately thirty times the magnitude of the rated current.

By placing a current limiting device in electrical series with each pole of a multi-pole circuit breaker and co-ordinating the trip element of the circuit breaker with the limiting device, it is possible to protect the circuit from all magnitudes of fault current without exceeding the interrupting rating of the circuit breaker. Thus, the circuit breaker may have a time delay trip unit for over-currents and a magnetic trip device for fault currents.

It will be noted that the interrupting rating of circuit breakers without current limiting devices is based on both the magnitude of fault current and length of time it will flow before complete interruption. However, when the circuit breaker is provided with a current limiting device, the length of time that a short-circuit current will flow is considerably reduced so that the interrupting rating of the circuit breaker could even be exceeded without damaging the circuit breaker.

The current limiting device connected in series would respond to severe short-circuits and interrupt these curcents rather than requiring the circuit breaker to perform this job. Since the magnitude of let-through current of the current limiting device is a relatively small percentage of the available short-circuit current, the interrupting capacity requirement of the circuit breaker is substantially reduced. However, it has been found that not only is electrical coordination between the two components necessary but it is also essential that there be mechanical coordination between the two units. That is, in the event fault should exist between one phase and ground, the rupture of the single fuse may result in single phasing and thus be detrimental to a load such as a motor. In order to avoid this possibility, the current limiting device is provided with a striker pin which is normally held inoperative by the fusible element.

Following the interruption of a severe short-circuit current by the current limiting device, the energy stored in a biasing spring is automatically released to thereby drive the striker pin forward. This movement of the pin can then be utilized to either energize a shunt trip coil, de-energize an undervoltage coil, or directly move a common trip bar of the circuit breaker so that all three poles of the circuit breaker will be opened following a rupturing of one or more of the current limiting devices.

Thus, although an original fault may be from one phase to ground and this fault is interrupted by means of the current limiting device, all three phases of the circuit will subsequently be opened as a result of the mechanical coordination between the components and hence, single phasing will be avoided.

In many instances, it has been preferable to use molded case circuit breakers as the protective device for electrical circuitry in preference to fuses since an automatic interruption of the circuit merely requires that the circuit breaker be manually restored to contact engaged position and does not necessitate the replacement of any component.

In contra-distinction, protective devices containing fusible elements must be replaced following each circuit interruption and, furthermore, require a cut-out switch. However, the extreme rapid interruption by the fusible element can not always be achieved by means of a circuit breaker due to the lapse in time in moving the operating mechanism to disengage the cooperating contacts.

However, by electrically and mechanically coordinating a current limiting device with a circuit breaker, it is possible to permit the circuit breaker to interrupt all over-currents and fault currents below a predetermined magnitude so that the circuit can be restored to normal poeration by merely operating a handle of the circuit breaker and moving the contacts to their engaged position. Thus, the advantages of the circuit breaker are retained.

In the event a severe short-circuit occurs, it is desirable to interrupt the circuit before the short-circuit current is permitted to reach its maximum magnitude and hence, for this condition, the current limiting device will operate. Hence following the occurrence of a severe short-circuit current, it will be necessary to replace the current limiting device.

In my instant invention, I have provided a novel auxiliary housing containing disconnect contact means to receive the current limiting device which will be electrically and mechanically associated with each pole of the circuit breaker. Thus, following circuit interruption of a severe short-circuit current, the auxiliary housing can be removed and the ruptured current limiting device can be removed and replaced by a new unit.

My novel auxiliary housing also serves as a safety means in the event an operator desires to work on the electrical line being protected by the circuit breaker-current limiting device combination. Thus, in many instances, even though the cooperating contacts of the circuit breaker can be moved to the disengaged position by means of a manual handle operation, it is dangerous for a man to work on the line since the circuit breaker contacts may be inadvertently closed by another individual when the handle is manually moved to the closed position. However, if the operator wishes to insure his safety while he is repairing or altering the line, he can remove the auxiliary housing.

Since this unit contains the current limiting devices which are in electrical series with each pole of the circuit breaker, manipulation of the circuit breaker handle to the "on" position will not restore energy to the electrical circuit and hence, the operator will continue to be protected.

In addition to the above noted feature, I have provided a second safety feature which can be achieved with my novel auxiliary housing. In the preferred arrangement of my invention, the current limiting devices are electrically connected on the load side of the circuit breaker. With the novel arrangement associated with my auxiliary housing, a circuit breaker is automatically tripped whenever the auxiliary housing is removed from the main housing of the circuit breaker.

As heretofore noted, one of the reasons for the use of a circuit breaker in preference to a fuse has been that a disconnect switch is always required in connection with a fuse so that the circuit can be interrupted on the source side whenever an operator has to replace the protective device. However, in my novel arrangement wherein the removal of the current limiting device auxiliary housing automatically trips the circuit breaker, the cooperating contacts of the circuit breaker serve as a disconnect switch on the source side of the fuses. Hence, the operator can readily remove and replace the current limiting device without sustaining injury since the circuit will be de-energized as a result of the disengagement of the circuit breaker contacts.

As has heretofore been noted, each of the current limiting devices utilized in my instant invention is provided with a striker pin. At least, only the current limiting devices associated with the phases of the circuit containing the fault will rupture. Hence, if there is a phase to ground fault, when the auxiliary housing is removed, only one of the plurality of current limiting devices will have its plunger extending forward to the extreme position. Thus, although the circuit breaker opens all three phases of the circuit, the operator will nevertheless be appraised of which phase contains the fault by merely observing the position of the striker pin of each of the current limiting devices in the auxiliary housing thereby facilitating the job of removing the fault from the circuit.

In the event there is a three phase fault, one, two or three devices may rupture but usually at least two will rupture. In this situation, removal of the auxiliary housing will at least appraise the operator that the fault current has exceeded the magnitude which the trip elements within the circuit breaker will automatically open.

An object of my invention is to provide a circuit protective means incorporating electrical and mechanical coordination between a circuit breaker and a current limiting device wherein the current limiting devices are readily removable and replaceable.

Still another object of my invention is to provide a circuit breaker-current limiting device arrangement in which the current limiting devices are contained within an auxiliary housing which is removably mounted on the circuit breaker.

A further object of my invention is to provide a novel auxiliary housing arrangement for a circuit breaker wherein current limiting means are readily removable and replaceable within the auxiliary housing.

A still further object of my invention is to provide an auxiliary unit for a circuit breaker which is connected thereto by means of disconnect contacts so that current limiting means can readily be removed and replaced following the rupture thereof.

A further object of my invention is to provide a current limiting housing which is removably mounted on a circuit breaker without the necessity of removing the front door of the circuit breaker enclosure or a cover of the circuit breaker.

Still another object of my invention is to provide a current limiting device housing which is interchangeable and replaceable for electrical and mechanical coordination with a circuit breaker.

Still another object of my invention is to provide an auxiliary housing containing current limiting devices which will serve as an automatic safety means so that the circuit being protected by the protective device can not be energized when the auxiliary housing is removed from the circuit breaker and provides a further safety means by insuring automatic trip of the circuit breaker whenever the auxiliary housing is removed.

These and other objects will be apparent from the following description when taken in connection with the drawings, in which:

Figure 1 is a side cross-sectional view of a center pole of a circuit breaker and illustrates the manner in which the time delay magnetic and current limiting trip means operate on a common tripper bar. This figure illustrates the manner in which the auxiliary housing is electrically and mechanically connected by means of disconnect contacts to the circuit breaker.

Figure 2 is a view taken in the direction of the arrows 2—2 of Figure 1 and illustrates a cross-sectional view of a multi-pole circuit breaker and the manner in which the components contained within the auxiliary housing are electrically and mechanically secured to the circuit breaker.

Figure 3 is a side view of a circuit breaker housing containing the auxiliary housing which, in turn, contains the current limiting devices.

Figure 4 is a top view of the circuit breaker of Figure 3 and illustrates the position of the auxiliary housing with respect to the operating handle thereof.

Figures 5a and 5b are cross-sectional views illustrating the manner in which the common tripper bar is rotated whenever the fused cover is removed.

The manner in which electrical and mechanical coordination between a current limiting device and a circuit breaker can be achieved are illustrated in my copending application Serial No. 461,378, filed October 11, 1954.

The operating mechanism 72, cooperating contacts 70—71, thermal trip 19—28 and magnetic trip 15—16 of the circuit breaker may be of any design which is well known in the art. In essence, the electrical and mechanical coordination between a current limiting device 17 and a circuit breaker enables the use of a circuit breaker having a relatively low interrupting capacity to be used in an electrical circuit having an available short-circuit current in excess of the interrupting capacity of the circuit breaker itself.

For all magnitudes of over-current and fault current within the range capable of being interrupted by the circuit breaker, the trip characteristics are such that the time delay trip 19—28 or the magnetic trip 15—16 will initiate operation of the circuit breaker so that the cooperating contacts 70—71 in all poles thereof are moved to the disengaged position. However, if a severe short-circuit should occur, the magnitude of which may exceed the interrupting capacity rating of the circuit breaker, the current limiting device 17 will rupture and thereby completely interrupt the fault current associated with the phase in which it occurred.

In order to prevent single phasing and to provide an automatic disconnect switch in coordination with the current limiting device 17, mechanical coordination is provided whereby the rupture of the current limiting device will result in the simultaneous opening of the cooperating contacts 70—71 of each pole of the circuit breaker.

My instant invention is directed to a novel arrangement whereby the current limiting devices 17 may be readily removable and replaceable.

In Figures 1 and 2, I have shown a common tripper bar 10 which is pivoted at 11 and extends through all of the poles of the circuit breaker. As is well known in the art, the common tripper bar 10 may contain a latch 73—74 so that the operating mechanism 72 is rendered inoperative and hence, the contacts 70—71 will remain in engaged position. However, upon rotation of the common tripper bar 10, the latch engagement 73—74 is released so that the operating mechanism 72 due to the stored energy in the opening springs 75 will be rendered operative to move the cooperating contacts 70—71 from their engaged position of Figure 1 to their completely disengaged position and hence, interrupt the circuit.

In a prior arrangement, the cooperating contacts 70—71 of the circuit breaker are opened by one of three means, that is, the circuit breaker can either be opened as a result of the time delay trip which is achieved by means of the bimetal 19, through an instantaneous trip which is achieved by means of the magnetic trip unit 16 or by means of the current limiting device 17. To this end, separate protrusions on the common tripper bar 10 are provided so that the tripper bar can be rotated by any one of the three trip units. Thus, as seen in Figure 1, the common tripper bar 10 has a protrusion or extension 12 which, when engaged by the extension 20, will rotate the common tripper bar 10 counterclockwise to thereby result in disengagement of the cooperating contacts 70—71.

In like manner, the extension 14 is positioned in close proximity to the plunger 15 of the magnetic trip 16 so that sufficient energization of the magnetic coil 16 will result in the movement of the plunger pin 15 to the right thereby engaging the extension 14 and rotating the common tripper bar 10 in a counterclockwise direction to open the cooperating contacts 70—71.

The extension 13 of the common tripper bar 10 is provided with a calibration screw 18 which will be engaged by the bimetallic element 19 on the occurrence of an overcurrent thereby rotating the common tripper bar in such a direction so as to move the cooperating contacts 70—71 to their disengaged position.

The electrical circuit and components of the trip section of the circuit breaker are as follows. The terminal 21 may be connected to the load to be energized by the circuit which is, in turn, protected by the protective device illustrated in the drawings. The terminal 21 also serves as the male contact to which the disconnect contacts 22, contained within the auxiliary housing 30, electrically and mechanically secure the auxiliary components to the circuit breaker. The disconnect contacts 22 are connected through conductors 23 to the clip means 24. Terminal 50 of the current limiting device 17 is secured within the clip means 24 so that the current limiting device 17 is electrically and mechanically connected thereto. The current passes from terminal 23 through the clip means 24 to terminal 50 and thence to the current limiting device 17.

It will be noted that the current limiting device 17 operates in substantially the same manner as set forth in Patent 2,592,399, issued April 8, 1952. That is, it contains a fusible element having a reduced cross-sectional area with quartz crystal surrounding the link. Due to the reduced cross-sectional area and the rapid melting of the quartz crystal, the current limiting device will actually interrupt severe short-circuit currents before the current reaches its maximum magnitude. That is, interruption occurs within a first quarter of a cycle so that the magnitude of let-through current is less than the magnitude of available short-circuit current.

In addition to having the current limiting features, the device 17 is also provided with a striker pin 34 which is biased to the right. The pin is held in its extreme left position by the fusible link. However, when the fusible link ruptures, the stored energy in the biased spring is released thereby driving the striker pin 34 to the right so that it can perform the function hereinafter described.

The manner in which the striker pin is released and the energy which may be supplied thereto is described in my copending applications Serial No. 316,221, filed October 22, 1952, now Patent No. 2,843,702, and Serial No. 461,378, filed October 11, 1954.

The current passing through the current limiting device 17 flows through the right hand terminal 51 of the current limiting device and thence to the clip means 25. Thus, the current limiting device 17 is electrically and mechanically secured at its right and left hand end by means of clips 24 and 25. The clip 25, in turn, is connected by means of a conductor to the disconnect contacts 26. The disconnect contacts, when the auxiliary housing 30 is in position, are in mechanical and electrical engagement with the male electrical prong 27 which is contained within the circuit breaker.

The auxiliary housing 30, which may be made of a molded material such as Bakelite, therefore, contains the disconnect contacts 22, conductor 23, clip means 24, the current limiting device 17 which is removable and replaceable within the auxiliary housing, clip means 25 and the disconnect contacts 26.

In addition to the electrical components, the auxiliary housing 30 also contains a trip unit through which the current limiting device 17 is operative to rotate the common tripper bar 10. Thus, mounted on pivot 31, there is a bar extending past all three current limiting devices contained within the auxiliary housing 30; three extensions 32 are provided which are in alignment with their respective striker pin 34 of the current limiting device 17. Thus, if the current limiting device 17 ruptures and the striker pin 34 is driven to the extreme right, it will engage its respective extension 32 to thereby drive this unit in a clockwise direction about its pivot 31.

The center pole is provided with an extension 20 from the common trip unit mounted at 31 so that the release of the striker pin 34 will rotate the extension member 20 clockwise to thereby engage the extension 12 and hence, rotate the common tripper bar 10 in a counterclockwise direction to release the latch 73—74 so that the main cooperating contacts 70—71 of the circuit breaker are moved to the disengaged position. Thus, for example, if a fault should occur in phase A, the current limiting device 17 associated with that phase will rupture thereby driving its pin 34 to the extreme right. This will result in a clockwise rotation of members 32 and 20 about the pivot 31.

The extension member 20, associated with the center pole, as seen in Figures 1 and 2, will thus engage the extension 12 to rotate the common tripper bar 10 so that the main cooperating contacts 70—71 associated with each of the phases A, B and C will be moved to their disengaged position. Thus, a severe short-circuit current occurring in any one phase will be completely interrupted by the current limiting device 17 associated with that phase. However, the rupture of the current limiting device 17 will result in the simultaneous disengagement of the cooperating contacts 70—71 associated with each pole of the circuit breaker so that single phasing is prevented and also will provide an automatic disconnect contact on the source side of the current limiting device 17.

As heretofore noted, current will flow through the disconnect contacts 21 and 22 through clip means 24 to the common tripper bar 17 and thence to the clip means 25 and through the disconnect contact 25 which is, in turn, connected to the contact 27 which is electrically and mechanically connected to the circuit breaker.

The male contact 27 is electrically connected to the magnetic coil 16 which forms the instantaneous or magnetic trip for the circuit breaker. The magnetic coil 16 is provided with an armature 52 pivoted at 53. Thus, when the coil 16 is sufficiently energized, the armature 52 will be rotated in a counterclockwise direction around its pivot 53. The magnetic coil 16 is provided with a plunger pin 15 which will be engaged whenever the armature 52 is energized to thereby drive the plunger 15 to its extreme right hand position.

As hereinafter noted, the common tripper bar 10 is provided with an extension 14 for each pole of the circuit breaker. In like manner, a coil similar to the magnetic trip 16 is provided for each pole of the circuit breaker. Hence, on the occurrence of a fault current, the magnetic coil 16 may be sufficiently energized to attract its armature 52 thereby driving the plunger 15 against an extension 14 to thereby rotate the common tripper bar 10 in a counterclockwise direction so that all three poles of the circuit breaker will be opened.

The opposite end of the magnetic coil 16 is connected to the conductor 54 which, in turn, is electrically connected to one leg of the U-shaped heater element 28. The opposite end of the heater element 28 is connected to the conductor 29 which, in turn, is electrically connected to the movable contact arm by means of a pigtail and the current subsequently flows from the movable contact to the stationary contact and thence to the source terminal of the circuit breaker.

The heater element 28 is positioned in close proximity to the bimetallic element 19. Thus, as is well known in the art, the bimetallic element 19 does not have to carry the load overcurrent or fault current but is responsive to the heat generated by the heater 28.

The bimetallic element 19 will deflect to the left when it is sufficiently heated by the heater element 28. Sufficient deflection of the bimetal 19 will result in its engagement with the calibration screw 18 which is connected to the extension 13 of the common tripper bar 10.

As heretofore noted, this will result in a counterclockwise rotation of the common tripper bar 10 about its pivot 11 thereby subsequently resulting in the disengagement of the cooperating contacts 70—71 in each pole of the multi-pole circuit breaker.

Thus, in summary, the disengagement of the main contacts 70—71 of the circuit breaker associated with each pole thereof is achieved by either deflection of the bimetallic element 19 on the occurrence of an overcurrent, the energization of the magnetic coil 16 as the result of fault current, or the release of the striker pin 34 when the current limiting device 17 ruptures.

Following an interruption of the circuit as a result of a severe short-circuit current, the fusible element in at least one of the current limiting devices 17 will be ruptured and all of the contacts of the circuit breaker will be opened. Hence, the operator will not be able to close the cooperating contacts of the circuit breaker by means of the handle 43 since the striker pin 34 will remain in its extreme right position thereby maintaining the lever 20—32 in its extreme clockwise position. This will result in maintaining the common tripper bar 10 in its extreme counter clockwise position thereby preventing relatching. Accordingly, it will be impossible for the operator to reset the contacts.

It should be noted that if circuit interruption results from the tripping operation of either the bimetallic element 19 or the magnetic trip 16 that the operator will be able to reset the circuit breaker contacts by means of the handle 43. However, if interruption occurs as a result of rupture of one of the current limiting devices 17, it will be necessary to replace the ruptured unit. To this end, my present invention provides a novel arrangement wherein the current limiting devices 17 are all contained within the auxiliary housing 30 which is seen in all of the figures.

The auxiliary housing is connected to the circuit breaker by means of its disconnect contacts 22—26 which electrically and mechanically interlock with the connecting means 21—27, respectively. Thus, if the operator finds that he is unable to reset the circuit breaker following interruption, it is merely necessary to remove the auxiliary molded housing 30 so that a new current limiting device may be replaced for the one that has interrupted the circuit.

The removal of the auxiliary housing 30 enables the operator to view all three current limiting devices and, by observing the position of the plunger 34 of each of the units, will immediately indicate which one of the several units has ruptured.

Since the current limiting device 17 is removably maintained within the auxiliary housing 30 by means of the electrical clips 24 and 25, the ruptured device can be readily removed and a new unit inserted in its place. It should be noted at this point that the auxiliary housing 30 can be provided with a transparent top so that there will be a visual indication to the operator which if any of the current limiting devices has ruptured without the necessity of removing the auxiliary housing from the circuit breaker.

Figure 3 illustrates the position and relation of the auxiliary housing 30 with respect to the molded housing 56 of the circuit breaker. As noted, the circuit breaker may be provided with a cover 44 which has a cut-away portion at 41 and 42. The cut-away portion at 41 is provided so that the operating handle 43 and escutcheon plate may extend upwardly. The opening 42 within the cover 44 is for the purpose of providing an area at which the auxiliary housing 30 can be removably connected to the circuit breaker.

As seen in Figures 3 and 4, the circuit breaker can be mounted with a front door 40 positioned flush with the top surface of the cover. In this case, the cover 40 will also have an opening to register with the opening 42 within the cover 44 so that the auxiliary housing 30 may be removably positioned on the circuit breaker without the necessity of removing the circuit breaker from its original position. That is, it will not be necessary to remove the cover plate 40 in order to remove the auxiliary housing.

It will be noted that in some instances, it will be desirable to remove the auxiliary housing 30 even though none of the current limiting devices 17 shown therein have been damaged or ruptured. Thus, for example, if an operator wishes to repair or work on the load side of the circuit being protected by the protective equipment, his safety can be insured by removing the auxiliary housing 30. Thus, with this unit removed, it would be impossible to energize the circuit. A further safety device is also provided with the auxiliary housing.

In Figures 5a and 5b, a second safety feature associated with the auxiliary housing is illustrated. As has heretofore been noted, it is desirable to provide a disconnect switch on the source side of the current limiting fuses. That is, it is desirable to have the circuit interrupter ahead of the current limiting devices so that the auxiliary housing 30 can be removed or connected to the disconnect contacts 21—27 of the circuit breaker without drawing an arc between these contacts and disconnect contact 22—26 within the auxiliary housing. That is, whenever the operator manually removes the auxiliary housing 30, it is desirable that the cooperating contacts of the circuit breaker be in the position so that no arc will exist between the cooperating disconnect contacts and hence, insure complete safety of the operator.

To this end, I have provided an arrangement illustrated in Figures 5a and 5b. On one of the outside poles as, for example, on the left-hand pole of the circuit breaker, there is a pin 60 which is biased by means of the spring 61 to an upward position with collar 62 and step 63 limiting the upward movement of the pin.

A shelf 64 contains the L-shaped member 65—66. Leg 65 is secured to the bottom end of the pin 60 and the leg 66 is positioned adjacent the extension 13 of the common tripper bar 10. The L-shaped member 65—66 pivots at points 67 on the shelf 64.

When the auxiliary housing 30 is positioned on the circuit breaker so that the disconnect contacts 21—22 and 26—27 are in mechanical and electrical engagement, the pin 60 is depressed to its lower position thereby storing energy in the spring member 61.

The downward movement of the pin 60 causes the L-shaped member 65—66 to rock in a counterclockwise direction around its pivot 67 thereby removing the extension 66 from engagement with the protrusion 13 of the common tripper bar 10. Thus, when the auxiliary housing 30 is in position, the extension 66 will have no influence on the common tripper bar. However, when the auxiliary housing 30 is removed from the circuit breaker, the energy stored in spring 61 will be released thereby driving the pin 60 upwardly. That is, when the cover no longer holds the pin 60 downwardly, the stored energy will be released. Hence, the L-shaped member 65—66 will be rocked clockwise around its pivot 67 so that its protrusion 66 will engage the extension 13 of the common tripper bar 10 thereby rotating same in a counterclockwise direction to subsequently result in the disengagement of the main cooperating contacts of the circuit breaker.

As seen in Figures 1 and 2, there is a considerable dimensional overlap between the male and female disconnect contacts. However, the required movement for the pin 60 is considerably less than the overlap of the disconnect contacts. Hence, initial movement of the auxiliary housing 30 toward removed position will result in the release of the stored energy in the spring 61 thereby causing the opening of the circuit breaker contacts before the disconnect contacts 21—22 and 26—27 are disengaged.

Continued upward pull on the auxiliary housing 30 will result in the disengagement of the disconnect contacts and since the main cooperating contacts of the circuit breaker are now open as a result of the operation of the mechanism shown in Figures 5a and 5b, the disconnect contacts will be opened on a current zero circuit. It will also be noted that when the housing 30 is again placed on the circuit breaker that the disconnect contacts will be in engagement before the housing depresses the pin 60. Hence, contact engagement between the cooperating members and disconnect contacts 21—22 and 26—27 will also occur on a current zero circuit. Thus, complete protection is afforded the operator in this novel arrangement.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. A circuit protective device having a first and second housing; said first housing containing a multi-pole circuit breaker; each pole of said circuit breaker having a pair of cooperating contacts with an engaged and disengaged position; a trip element; said trip element responsive to fault current below a first predetermined current magnitude to effect disengagement of said cooperating contacts; current limiting devices; said current limiting devices removably mounted in said second housing; said first and second housing having cooperating disconnect contacts to permit said second housing to be removably connected to said first housing; said disconnect contacts connecting said cooperating contacts, said trip means and said current limiting device in electrical series; said current limiting device having a fusible element responsive to interrupt current flow above said first predetermined current magnitude.

2. A circuit protective device having a first and second housing; said first housing containing a multi-pole circuit breaker; each pole of said circuit breaker having a pair of cooperating contacts with an engaged and disengaged position; a trip element; said trip element responsive to fault current below a first predetermined current magnitude to effect disengagement of said cooperating contacts; current limiting devices; said current limiting devices removably mounted in said second housing; said first and second housing having cooperating disconnect contacts to permit said second housing to be removable connected to said first housing; said disconnect contacts connecting said cooperating contacts; said trip means and said current limiting device in electrical series; said current limiting device having a fusible element responsive to interrupt current flow above said first predetermined current magnitude; said disconnect contacts positioning said second housing to permit mechanical coordination between said current limiting device and said circuit breaker.

3. In a multipole circuit protective device comprised of a circuit breaker and current limiting devices; said circuit breaker contained within a first housing; a pair of cooperating contacts, a trip element and disconnect contacts associated with each pole of said circuit breaker; said current limiting devices removably connected to a second housing; said second housing having a current limiting device and disconnect contacts associated with each pole of said circuit breaker; said second housing removably connected to said circuit breaker by means of said disconnect contacts; means to move said cooperating contacts from said engaged position to said disengaged position when said second housing is removed from said first housing; said current limiting device associated with any one pole of said circuit breaker electrically connected to interrupt the current flow in its associated pole when the current magnitude exceeds a first predetermined value; said current limiting device having means to simultaneously move the cooperating contacts of all poles of said circuit breaker from said engaged position to said disengaged position.

4. In a multi-pole circuit protective device comprised of a circuit breaker and current limiting devices; said circuit breaker contained within a first housing; a pair of cooperating contacts, a trip element and disconnect contacts associated with each pole of said circuit breaker; said current limiting devices removably connected to a second housing; said second housing having a current limiting device and disconnect contacts associated with each pole of said circuit breaker; said second housing removably connected to said circuit breaker by means of said disconnect contacts; means to move said cooperating contacts from said engaged position to said disengaged position when said second housing is removed from said first housing; said current limiting device associated with any one pole of said circuit breaker electrically connected to interrupt the current flow in its associated pole when the current magnitude exceeds a first predetermined value; said current limiting device having means to simultaneously move the cooperating contacts of all poles of said circuit breaker from said engaged position to said disengaged position; means to move said cooperating contacts from said engaged position to said disengaged position when said second housing is removed from said first housing.

5. A multi-pole circuit breaker and current limiting means; said multi-pole circuit breaker contained within a first housing and having a pair of cooperating contacts, disconnect contact means and a trip element associated with each pole of said circuit breaker; a common tripper bar for all three poles of said circuit breaker; each of said trip element operatively connected to said common tripper bar to result in simultaneous disengagement of said contacts associated with each pole of said circuit breaker on the occurrence of a fault current in any one pole below a predetermined current magnitude; a second housing containing a current limiting device and disconnect contact means associated with each pole of said circuit breaker; said second housing and said current limiting means removably connected to said circuit breaker by said disconnect contact means; said current limiting means operative to interrupt current magnitudes flowing in its respective pole above the first predetermined magnitude; each of said current limiting devices operatively connected to said common tripper bar to simultaneously disengage all of said cooperating contacts of said circuit breaker.

6. A multi-pole circuit breaker and current limiting means; said multi-pole circuit breaker contained within a first housing and having a pair of cooperating contacts; disconnect contact means and a trip element associated with each pole of said circuit breaker; a common tripper bar for all three poles of said circuit breaker; each of said trip element operatively connected to said common tripper bar to result in simultaneous disengagement of said contacts associated with each pole of said circuit breaker on the occurrence of a fault current in any one pole below a predetermined current magnitude; a second housing containing a current limiting device and disconnect contact means associated with each pole of said circuit breaker; said second housing and said current limiting means removably connected to said circuit breaker by said disconnect contact means; said current limiting means operative to interrupt current magnitudes flowing in its respective pole above the first predetermined magnitude; each of said current limiting devices operatively connected to said common tripper bar to simultaneously disengage all of said cooperating contacts of said circuit breaker; means operatively connected to cause simultaneous disengagement of all the contacts of said circuit breaker when said second housing is removed from said first housing by the disengagement of said disconnect contact means.

7. In a multi-pole circuit breaker with each pole having a pair of cooperable contacts; a latch mechanism current responsive means in each pole for operating said latch in response to a predetermined current value to effect simultaneous disengagement of said cooperating contacts in all poles of said circuit breaker; a pair of terminals for each pole of said circuit breaker for connecting said circuit breaker to a polyphase electrical circuit to be protected thereby; a first housing for said circuit breaker; a current limiting device for each pole of said circuit breaker; each of said current limiting devices having a fusible element; said current limiting devices contained within a second housing; disconnect contacts for removably connecting said second housing to said first housing and for simultaneously electrically connecting said current responsive means and said cooperable contacts of said circuit breaker and said current limiting devices in electrical series; a mechanism released when said current limiting device is energized by a fault current for releasing said latch of said circuit breaker to effect simultaneous disengagement of said cooperable contacts; said mechanism of said current limiting devices being automatically positioned when said second housing is connected to said first housing through said disconnect contacts.

8. A circuit protective device having a first and second housing; said first housing containing a multi-pole circuit breaker with each pole having a pair of cooperating contacts and a trip element; said cooperating contacts having an engaged and disengaged position with respect to each other; each of said trip elements operative for fault currents below a first predetermined current magnitude to effect simultaneous disengagement of said cooperating contacts; a current limiting device for each pole of said circuit breaker; said current limiting devices being mounted in said second housing; said first and second housing having cooperating disconnect contacts to permit said second housing to be removably connected to said first housing; said disconnect contacts connecting one of said pairs of cooperating contacts, one of said trip elements and one of said current limiting devices in electrical series for each pole of said circuit breaker; each of said current limiting devices having a fusible element responsive to interrupt current magnitudes above said first predetermined current magnitude.

9. A circuit protective device having a first and second housing; said first housing containing a multi-pole circuit breaker with each pole of said circuit breaker having a pair of cooperating contacts and a trip element; each of said pairs of cooperating contacts having an engaged and disengaged position; each of said trip elements being responsive to fault currents below a first predetermined current magnitude to effect simultaneous disengagement of all of said pairs of said cooperating contacts; a current limiting device for each pole of said circuit breaker; each of said current limiting devices being mounted in said second housing; said second housing having a pair of terminals associated with each of said current limiting devices, the terminals of each pair of terminals of said second housing connected to each other through its associated current limiting device; said first housing having a pair of terminals associated with each pole of said circuit breaker; each terminal of each pair of terminals of said first housing means being separate and unconnected; each of said terminal pairs from one of said housings adapted to receive a corresponding terminal pair from the other of said housings to thereby connect one terminal from said first housing to its respective other terminal of the pair through a current limiting device in said second housing; said pairs of terminal of said first and second housing operatively connecting one of said trip elements and one of said current limiting devices in electrical series with each pole of said circuit breaker to permit electrical coordination; each of said current limiting devices having a fusible element responsive to and operative to interrupt current magnitudes above said first predetermined current magnitude; said pairs of terminals of said first and second housing positioning said second housing with respect to said first housing to permit mechanical coordination between said current limiting devices and said circuit breaker.

10. In a multi-pole circuit protective device comprised of an automatic circuit breaker contained within a first housing and having a pair of cooperating contacts, a trip element and disconnect means associated with each pole thereof; a current limiting device for each pole of said circuit breaker; each of said current limiting devices being mounted in a second housing and having two terminals means associated therewith; said terminal means being connected to each other through said current limiting device; said second housing being removably connected to said circuit breaker by means of said disconnect means and said terminal means; an interlock means operative to simultaneously move each pair of said cooperating contacts from said engaged position to said disengaged position when said second housing is moved from said first housing; each of said current limiting devices being electrically connected to interrupt current flow in its associated point of said circuit breaker when the current magnitude exceeds a first predetermined magnitude; each of said current limiting devices having means to simultaneously move each of said pairs of cooperating contacts of said circuit breaker from said engaged position to said disengaged position following the occurrence of a current magnitude exceeding said first predetermined current magnitude.

11. A multi-pole circuit breaker contained within a first housing and having a pair of cooperating contacts, a pair of disconnect contacts, and a trip element associated with each pole of said circuit breaker, a common tripper bar for all poles of said circuit breaker; each pair of said cooperating contacts having an engaged and disengaged position; operating mechanism controlled by said common tripper bar is simultaneously moving all of said pairs of cooperating contacts from said engaged position to said disengaged position; each of said trip elements positioned and operative through said common tripper bar to effect simultaneous disengagement of all of said pairs of cooperating contacts on the occurrence of a fault current in any one pole of said circuit breaker below a predetermined current magnitude; a second housing, a plurality of current limiting devices equal in number to the number of poles of said circuit breaker whereby each of said current limiting devices is associated with one pole of said circuit breaker; said second housing containing each of said current limiting devices and a pair of terminal means for each of said current limiting devices; the terminal means of a pair connected to each other through the current limiting devices with which it is associated; said second housing and said current limiting means removable connected to said circuit breaker by engagement of said terminal means with said disconnect contacts; each of said current limiting devices operative to interrupt current magnitudes flowing in its respective pole above said predetermined current magnitude; each of said current limiting devices operatively connected through said common tripper bar to said operating mechanism to effect simultaneous disengagement of said pairs of cooperating contacts of said circuit breaker following the occurrence of a fault current above said predetermined current magnitude.

12. A circuit protective device having a first and second housing; said first housing containing a multipole circuit breaker; each pole of said circuit breaker having a pair of cooperating contacts with an engaged and disengaged position; a trip element; said trip element responsive to fault current below a first predetermined current magnitude to effect disengagement of said cooperating contacts; current limiting devices; said current limiting devices removably mounted in said second housing; said first and second housing having cooperating disconnect contacts to permit said second housing to be removable connected to said first housing; said disconnect contacts connecting said cooperating contacts; said current limiting device and a portion of said trip means being connected in electrical series; said current limiting device having a fusible element responsive to interrupt current flow above said first predetermined current magnitude; said disconnect contacts positioning said second housing to permit mechanical coordination between said current limiting device and said circuit breaker.

13. A current interrupting device comprising a current limiting fuse means removably mounted within a first housing and a circuit breaker mounted within a second housing; disconnect means for connecting said circuit breaker and said current limiting means; said current limiting means first housing being removably mounted at the end of said circuit breaker second housing when said disconnect means connects said circuit breaker and said current limiting means.

14. A current interrupting device comprising a current limiting means removably mounted within a first housing and a circuit breaker mounted within a second housing; disconnect means for connecting said circuit breaker and said current limiting means; said current limiting means first housing being removably mounted at the end of said circuit breaker second housing when said disconnect means connects said circuit breaker and said current limiting means; said circuit breaker being constructed to have automatic trip means associated therewith for automatically operating said circuit breaker in mechanical coordination with said current limiting means.

15. A current interrupting device for connecting a load to a line comprising a current limiting fuse means removably mounted within a first housing and a circuit breaker mounted within a second housing; disconnect means for connecting said circuit breaker and said current limiting means; said current limiting means first housing being removably mounted at the end of said circuit breaker second housing when said disconnect means connects said circuit breaker and said current limiting means; said current limiting means forming the load side of said current interrupting device.

16. A current interrupting device for a multi-phase electrical system comprising a current limiting means removably mounted within a first housing and a circuit breaker mounted within a second housing; said current limiting means comprising a current limiting fuse for each phase of said multi-phase system; said circuit breaker having a pair of cooperating contacts for each phase of said multi-phase system; disconnect means for connecting one of said current limiting fuses in series with one of said pair of cooperating contacts for each phase of said multi-phase system; said current limiting means first housing being removably mounted at the end of said circuit breaker second housing when said disconnect means connects said circuit breaker contacts and said current limiting fuses in series.

References Cited in the file of this patent

UNITED STATES PATENTS

| | | |
|---|---|---|
| 974,109 | Auel et al. | Nov. 1, 1910 |
| 1,192,974 | Anderson | Aug. 1, 1916 |
| 1,232,412 | Van Valkenburg | July 13, 1917 |
| 2,330,690 | Dannenberg | Sept. 28, 1943 |
| 2,376,789 | Leonard | May 22, 1945 |
| 2,473,196 | Dannenberg | June 14, 1949 |
| 2,476,071 | Spiro | July 12, 1949 |
| 2,536,944 | Kirkby | Jan. 2, 1951 |

FOREIGN PATENTS

| | | |
|---|---|---|
| 13,522 | Australia | Dec. 13, 1934 |
| 449,340 | Germany | June 7, 1930 |